United States Patent [19]
Skinner

[11] 3,740,079

[45] June 19, 1973

[54] VEHICULAR TOWING HITCH

[76] Inventor: Gale N. Skinner, 272 West First South, Logan, Utah 84321

[22] Filed: Aug. 20, 1970

[21] Appl. No.: 65,521

[52] U.S. Cl. ................................................ 280/480
[51] Int. Cl. .............................................. B60d 1/04
[58] Field of Search ......................... 280/480, 491 C

[56] References Cited
UNITED STATES PATENTS

| | | | |
|---|---|---|---|
| 1,485,888 | 3/1924 | Schonberg | 280/480 |
| 1,591,105 | 7/1926 | Rolland | 280/480 |
| 1,845,859 | 2/1932 | Williamson | 280/480 |
| 1,384,835 | 7/1921 | Hines | 280/480 |

Primary Examiner—Leo Friaglia
Assistant Examiner—Robert R. Song
Attorney—Olson, Trexler, Walters & Bushnell

[57] ABSTRACT

A vehicular towing device for attachment to a conventional automobile trailer hitch for temporary towing of another vehicle has been invented. The towing device comprises hitch means for fastening said towing device to a conventional automobile trailer hitch attached to the towing vehicle and a pair of heavy duty towing chains, cables or heavy duty cords attached to the hitch means. The towing chains, cables or cords are attached at substantially a common point to the hitch means. Attached at the free ends of such cables or the like are hook means for securing said cables or the like to the frame or axle members of the towed vehicle.

2 Claims, 3 Drawing Figures

PATENTED JUN 19 1973  3,740,079

INVENTOR.
GALE N. SKINNER

BY *William S. Britt*

ATTORNEY

VEHICULAR TOWING HITCH

BACKGROUND OF THE INVENTION

Various towing devices for towing vehicles are illustrated in the art. U.S. Pat. No. 1,384,835, illustrates a chain device for attachment to the rear axle of a towing vehicle and to the front axle of a towed vehicle. The device illustrated in said patent requires considerable time for attachment to each vehicle.

Other towing devices are illustrated in U.S. Pat. Nos. 2,139,970 and 3,000,652. Each of the devices illustrated in these patents is designed for attachment to the bumpers of the towing and the towed vehicles. Because of the lack of extended bumpers on modern vehicles and the inadequate strength in tension of bumpers generally, such devices are not satisfactory where the towed vehicle is heavy or bogged down in snow or mud.

Towing devices having a pair of arms extending from hitch means are illustrated in U.S. Pat. Nos. 3,427,045 and 3,492,022. The devices illustrated in these patents have rigid arms extending from a hitching means for hitching to a towing vehicle. The rigid arms are not readily flexible for connecting to under-body elements such as frame or axle members. The towing devices illustrated in these patents are designed primarily for attachment to permanent towing loops attached to the towed vehicle and located near a forward, outboard position on the vehicle. The towing devices illustrated in these patents are designed to tow vehicles which have been especially prepared for towing and not for the purpose of towing automobiles, trucks, or other motor vehicles which have become stranded because of mechanical failure or loss of traction.

OBJECTS OF THE INVENTION

It is an object of the instant invention to provide a towing device which can be attached readily to a conventional automobile trailer hitch and attached to the axle or frame members of a towed vehicle. It is a further objective of this invention to provide a towing hitch which may be compactly stored and quickly attached to the towing vehicle and to the towed vehicle.

DESCRIPTION OF THE INVENTION

A towing device for towing one vehicle with another which may be quickly fastened to a conventional automobile trailer hitch of the towing vehicle and attached by hooks appended to the ends of chain, cable, or cord means to underbody frame or axle members of the towed vehicle has now been invented.

Further description of the invention may be facilitated by reference to the attached drawings.

Figure 1:
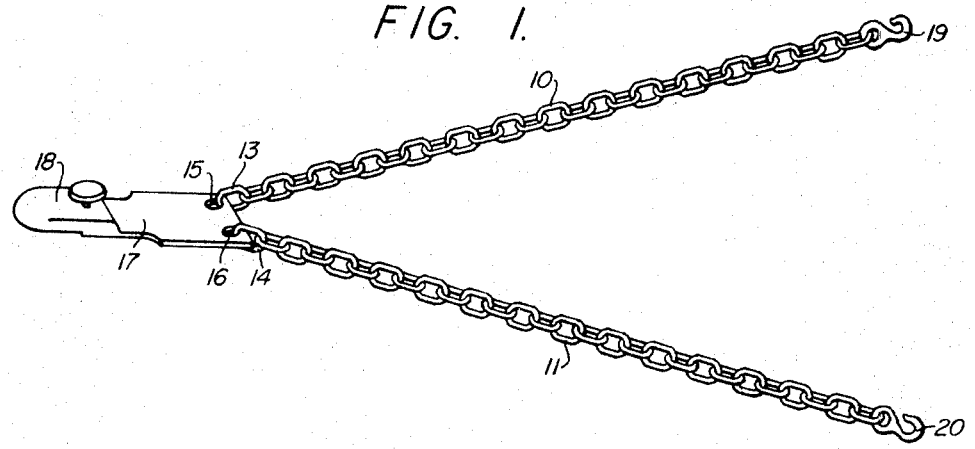
FIG. 1 is a perspective view of a towing device for attachment to the ball of a conventional automobile trailer hitch.

In FIG. 1 a towing device of this invention is illustrated wherein a pair of chains 10 and 11 are attached by links 13 and 14 to a pair of openings 15 and 16 in the rear portion of hitch means 17. A pair of openings 15 and 16 are illustrated, however, a single opening sufficiently large to accommodate a pair of lines (chains, cables or cords) could be utilized. The width of hitch means 17 is generally relatively small so that openings 15 and 16 are in close proximity to one another. At the forward end of hitch means 17 is located a spherical fastener 18 which is a conventional fastening device for fastening to the ball of a conventional automobile hitch for towing of trailers and the like. The lines 10 and 11 are sufficiently sturdy for towing of large automobiles, medium size trucks and the like. Attached to the free ends of both chains are hooks 19 and 20 which are utilized for hooking to or about frame members or axle members of the towed vehicle. The hooks may be large or only of a sufficient size for passing about a frame or axle member and hooking to a link of said chain or about said chain.

Figure 2:
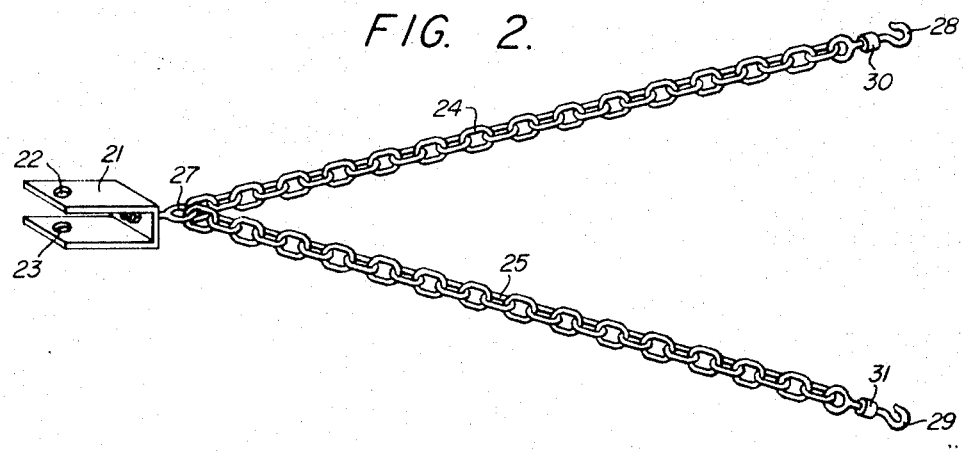
FIG. 2 is a perspective view of a towing device for attachment by a draw pin and conventional open towing hitch.

In FIG. 2 another embodiment of the instant invention is illustrated wherein the trailer hitch means 21 is a U-shaped member having sufficient width to accommodate a pair of opposed holes 22 and 23 to receive a draw pin and thereby attach to a automobile towing hitch which has a single hole therein, for example, for use with an automobile towing hitch in which the ball is unbolted from said hitch in order to receive a draw-pin. The opposed, flat members of hitch 21 are sufficiently spaced apart to accommodate a simple, flat trailer hitch extension. The chains, cables or cords 24 and 25 are attached to an eye-bolt which is bolted to the hitch means 21. This permits the hitch means 21 to be easily rotated about the eye-bolt 27 for ease of alignment with the hole of the automobile towing hitch. At the free ends of said chains the hook means 28 and 29 are attached by swivel links 30 and 31 to said chains to permit said hooks to be easily attached to frame or axle members or to the towing chain themselves.

Figure 3:
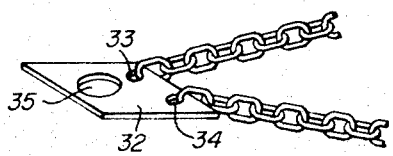
FIG. 3 is a perspective view of hitch means for temporary attachment to the ball of a conventional automobile towing hitch.

The towing hitch 32 illustrated in FIG. 3 has a pair of openings 33 and 34 to receive towing chains of the type illustrated in FIGS. 1 and 2. The hitch means 32 has a large opening 35 in its forward portion. The opening 35 is sized such that it fits over the ball of a conventional automobile towing hitch. The hitch means 32 is designed for quick attachment and for temporary use in towing a stuck vehicle since the hitch is not secured in any fashion to the ball of the automobile towing hitch.

Although the towing device of this invention has been described hereinabove with reference to a towing chain it is understood that heavy towing cables, cords or other suitable flexible towing lines could be utilized in place of chains. For example, heavy duty nylon cords are especially useful. It is desired that the towing lines be sufficiently flexible that the lines can be readily drawn under a towed vehicle and twisted about an axle or frame member.

The towing lines of the towing device of this invention may be any desired length, however, it is preferred that the lines be at least about one-half the length of a conventional automobile. This length is preferred so that the towing vehicle can tow a mired vehicle without getting so close as to also become mired. Also, the long forward overhang of modern automobiles renders it desirable to have a length sufficient to attach the frame members of the towed vehicle without bumper to bumper contact of the towed and towing vehicle.

The advantages of the instant invention are that the towing device is attached to an automobile towing hitch which is generally secured to frame members of the towing vehicle so that there is no danger of damage to the towing vehicle. Also, the towing device is attached at the free ends to frame or axle members of the towed vehicles so that no damage should result to the towed vehicle. Furthermore, the devices illustrated in FIGS. 1 and 2 are securely attached to both vehicles so that there is no danger of the towing device coming unfastened due to jerking associated with towing or pulling a stuck vehicle or the bouncing or jogging associated with towing a vehicle over rough terrain. Also, the instant towing device can be quickly attached to each vehicle and be equally rapidly detached from said vehicles. Furthermore, the towing device may be easily carried in a trunk of an automobile or a bed of a truck without consuming much space.

Although the instant invention has been described hereinabove with reference to specific embodiments it is not intended that the invention be limited solely thereto but to include all the variations and modifications falling within the scope of the appended claims.

I claim:

1. A towing device for towing one vehicle with another vehicle including an elongate hitch means, having a forward spherical section adapted for direct attachment to the ball of a conventional automobile towing hitch, a section in the form of a metal plate extending rearwardly therefrom and integral therewith, said plate being apertured for accommodating a pair of towing lines, and a pair of heavy duty flexible towing lines attached to the rearward section of said hitch means at substantially a common point, the free extremities of said flexible towing lines adapted for attachment to the frame of a vehicle at widely separated points, whereby to transmit substantially equal pulling force at said separated points when said hitch means is urged forwardly.

2. The towing device of claim 1 wherein the towing lines are at least about one-half the length of a conventional automobile.

* * * * *